US010608340B2

(12) United States Patent
Kim et al.

(10) Patent No.: US 10,608,340 B2
(45) Date of Patent: Mar. 31, 2020

(54) ANTENNA MODULE AND ELECTRONIC DEVICE HAVING THE SAME

(71) Applicant: WITS Co., Ltd., Yongin-si, Gyeonggi-do (KR)

(72) Inventors: Si Hyung Kim, Suwon-si (KR); Tae Heon Lee, Suwon-si (KR); Ki Won Chang, Suwon-si (KR); Taek Woo Kim, Suwon-si (KR); Dae Ung Ahn, Suwon-si (KR); Hyung Wook Cho, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 170 days.

(21) Appl. No.: 15/880,944

(22) Filed: Jan. 26, 2018

(65) Prior Publication Data

US 2018/0287258 A1 Oct. 4, 2018

(30) Foreign Application Priority Data

Mar. 31, 2017 (KR) ........................ 10-2017-0041912
Jul. 25, 2017 (KR) ........................ 10-2017-0094332
Dec. 27, 2017 (KR) ........................ 10-2017-0180926

(51) Int. Cl.

*H01Q 7/06* (2006.01)
*H02J 50/10* (2016.01)
*G06K 7/10* (2006.01)
*H04B 5/00* (2006.01)
*H01Q 1/52* (2006.01)

(52) U.S. Cl.

CPC ........... *H01Q 7/06* (2013.01); *G06K 7/10158* (2013.01); *G06K 7/10336* (2013.01); *H02J 50/10* (2016.02); *H04B 5/0037* (2013.01); *H04B 5/0062* (2013.01); *H01Q 1/521* (2013.01)

(58) Field of Classification Search

CPC ........... H01Q 7/06; H01Q 1/521; H02J 50/10; G06K 7/10158; G06K 7/10336; H04B 5/0037; H04B 5/0062

See application file for complete search history.

(56) References Cited

U.S. PATENT DOCUMENTS 10,417,550 B2 * 9/2019 Kwon .................. H01Q 1/2216
10,469,133 B2 * 11/2019 Ahn ......................... H01Q 7/00
(Continued)

FOREIGN PATENT DOCUMENTS

CN 101989681 A 3/2011
CN 105958183 A 9/2016
CN 106299706 A 1/2017
(Continued)

*Primary Examiner* — Dameon E Levi
*Assistant Examiner* — David E Lotter
(74) *Attorney, Agent, or Firm* — Harness, Dickey & Pierce, P.L.C.

(57) ABSTRACT

An antenna module includes a wiring part including a first antenna wiring and a second antenna wiring disposed on a substrate; and a magnetic part including a first magnetic part disposed on one surface of the wiring part and a second magnetic part disposed on the other surface of the wiring part, wherein the first magnetic part is disposed on one surface of the wiring part so as to face a portion of the first antenna wiring and a portion or the entirety of the second antenna wiring, and the second magnetic part is disposed on the other surface of the wiring part so as to face the other portion of the first antenna wiring.

23 Claims, 8 Drawing Sheets

40 45 42 43 44 41 80b 80 80a

(56) References Cited

U.S. PATENT DOCUMENTS

| | | | |
|---|---|---|---|
| 2016/0043466 | A1 | 2/2016 | Tao et al. |
| 2017/0047636 | A1 | 2/2017 | Lee et al. |

FOREIGN PATENT DOCUMENTS

| | | | |
|---|---|---|---|
| CN | 208352514 | U | 1/2019 |
| JP | 2013-146050 | A | 7/2013 |
| JP | 2016-225675 | A | 12/2016 |
| KR | 10-2017-0018646 | A | 2/2017 |
| KR | 10-2017-0072773 | A | 6/2017 |

* cited by examiner

ANTENNA MODULE AND ELECTRONIC DEVICE HAVING THE SAME

CROSS-REFERENCE TO RELATED APPLICATION(S)

This application claims benefit under 35 USC § 119(a) of Korean Patent Application Nos. 10-2017-0041912 filed on Mar. 31, 2017, 10-2017-0094332 filed on Jul. 25, 2017 and 10-2017-0180926 filed on Dec. 27, 2017 in the Korean Intellectual Property Office, the entire disclosures of which are incorporated herein by reference for all purposes.

BACKGROUND

1. Field

The following description relates to an antenna module and an electronic device having the same.

2. Description of Related Art

As portable terminals such as smartphones become widespread and functions thereof are improved, a payment method using the short-range communications function of portable terminals has emerged. However, since a data transmission channel may not be present between a POS terminal, which is commonly installed in a store, and smartphones, payments using smartphones face many obstacles. In order to overcome such obstacles, methods using a 2D barcode or near field communication (NFC) have been proposed.

However, since such a payment means of a 2D barcode or NFC type does not have a reading apparatus suitable for the POS terminal, it is difficult to apply the payment means. In particular, NFC has disadvantages in that it lacks NFC performance standardized in many smartphones and needs to include a separate apparatus for reading NFC performance.

Therefore, methods capable of performing payments using smartphones while using a POS terminal generally installed in an existing store or the like are proposed. In particular, a magnetic secure transmission (MST) method capable of performing a payment without adding a separate reading apparatus to the POS terminal has recently been proposed.

Further, both an NFC antenna and an MST antenna may be mounted on one portable terminal. Therefore, an arrangement structure of antennas capable of maintaining communications performance of the respective antennas in the portable terminal is needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an antenna module includes a wiring part including a first antenna wiring and a second antenna wiring each disposed on a substrate, and a magnetic part including a first magnetic part disposed on one surface of the wiring part and a second magnetic part disposed on another surface of the wiring part, wherein the first magnetic part is disposed on one surface of the wiring part to face a portion of the first antenna wiring, and a portion or the entirety, of the second antenna wiring, and wherein the second magnetic part is disposed on another surface of the wiring part to face the other portion of the first antenna wiring.

The second magnetic part may be disposed not to overlap with the first magnetic part.

The first magnetic part and the second magnetic part may include different materials or have different thicknesses.

The wiring part may include an extended wiring disposed to face the first magnetic part and may be connected to the first antenna wiring.

The first antenna wiring and the extended wiring may be disposed in spiral directions, and a spiral direction of the extended wiring may be opposite to the spiral direction of the first antenna wiring.

The wiring part may include a power receiving wiring disposed to face the first magnetic part.

The first antenna wiring may be connected to the power receiving wiring, and the first antenna wiring and the power receiving wiring may be disposed in spiral directions, and the spiral direction of the power receiving wiring may be opposite to the spiral direction of the first antenna wiring.

The first antenna wiring may be disposed within the second antenna wiring.

The wiring part may include a body part, wherein the second antenna wiring may be disposed on the body part, and an extended portion protruding from the body part, wherein a portion of the first antenna wiring may be disposed on the extended portion, and wherein the extended portion may have a width narrower than that of the body part.

The second magnetic part may be coupled to the wiring part, wherein a portion of the second magnetic part may protrude externally from the wiring part.

The first antenna wiring may include a solenoid structure wound around the second magnetic part.

The substrate may include a first substrate and a second substrate, and the first antenna wiring may include a first pattern disposed on the first substrate, a second pattern disposed on the second substrate, and interlayer connection conductors disposed to penetrate through the first substrate and the second substrate and connecting the first pattern and the second pattern with each other.

A boundary at which the first magnetic part and the second magnetic part are in contact with each other may be disposed to cross a central region of the first antenna wiring.

The first antenna wiring may include a first pattern disposed on a first surface of the substrate and a second pattern disposed on a second surface of the substrate, wherein the first magnetic part may be disposed on the second surface of the substrate to face the first pattern, and wherein the second magnetic part may be disposed on the first surface of the substrate to face the second pattern.

The second magnetic part may be in surface contact with the substrate and may be coupled to the wiring part.

In one general aspect, an electronic device includes an antenna module including a wiring part comprising a first antenna wiring and a second antenna wiring disposed on a substrate, and a magnetic part comprising a first magnetic part disposed on one surface of the wiring part and a second magnetic part disposed on another surface of the wiring part, and a case including the antenna module, wherein the first magnetic part is coupled to one surface of the wiring part to face a portion of the first antenna wiring and the second magnetic part is coupled to the wiring part to face the other portion of the first antenna wiring, and the second magnetic part is disposed between the wiring part and the case.

In another general aspect, an electronic device includes an antenna module including a wiring part including a first antenna wiring, a second antenna wiring, and a power receiving wiring, each disposed on a substrate, a magnetic part including a first magnetic part disposed on one surface of the wiring part, and a second magnetic part disposed on another surface of the wiring part, wherein the power receiving wiring is disposed to face the first magnetic part and is connected to the first antenna wiring, and a switching circuit including connections to the first antenna wiring and the power receiving wiring.

The power receiving wiring and the first antenna wiring may function as a Magnetic Secure Transmission (MST) antenna.

The power receiving wiring may function as a wireless charging antenna.

The electronic device may include a cellular phone, a notebook, a tablet personal computer, or a wearable device.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
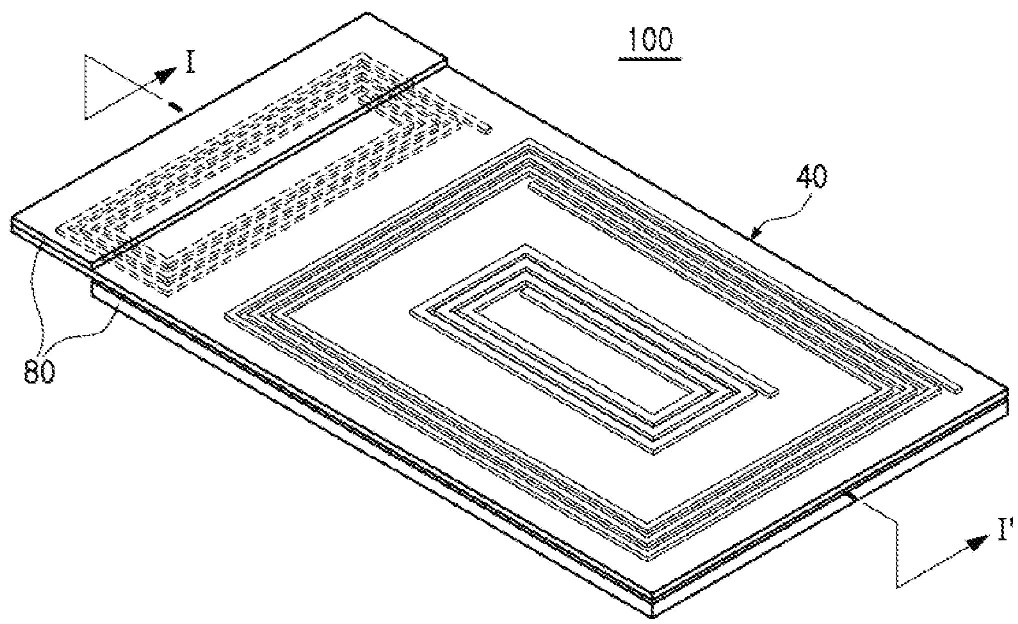
FIG. 1 is a perspective view of an antenna module according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
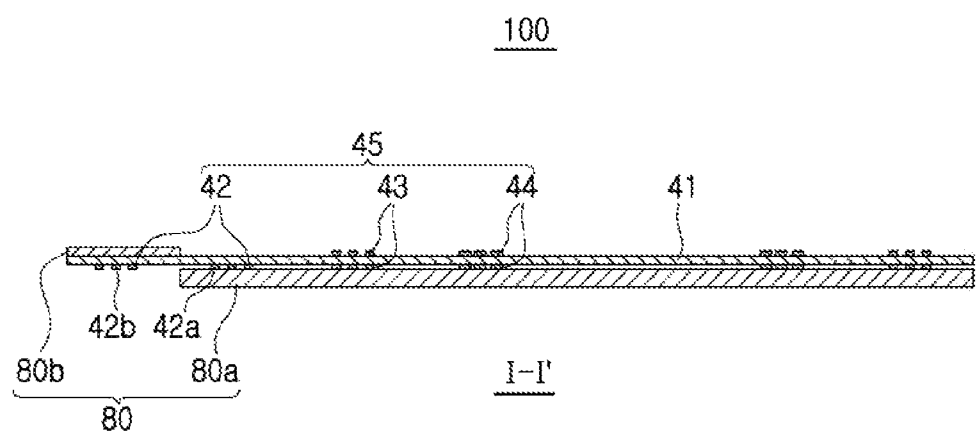
FIG. 2 is a cross-sectional view of an antenna module taken along a line I-I' of FIG. 1.

FIG. 1 is a perspective view of an antenna module according to an embodiment and FIG. 2 is a cross-sectional view of the antenna module taken along a line I-I' of FIG. 1.

Figure 3:
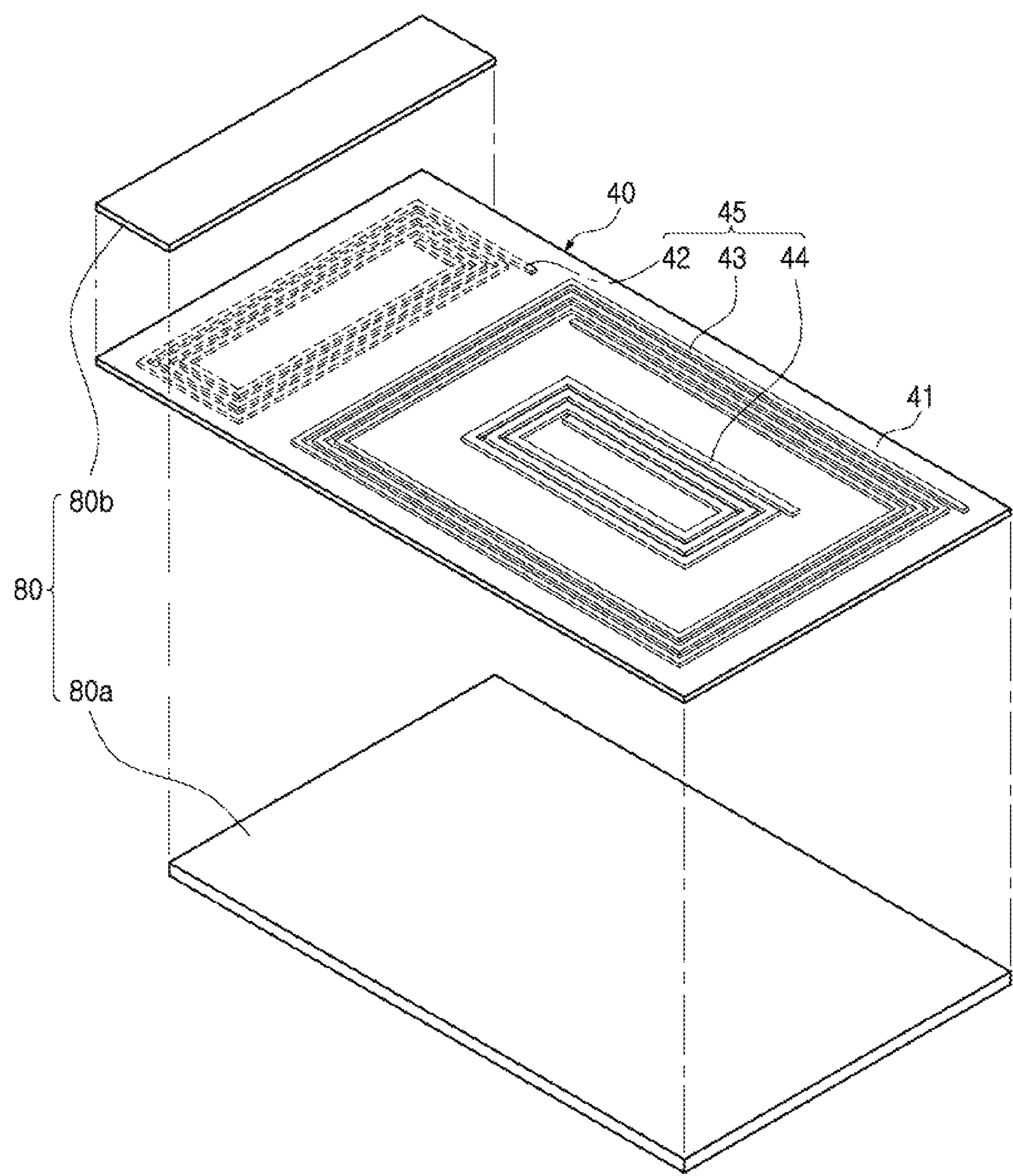
FIG. 3 is an exploded perspective view of an antenna module illustrated in FIG. 1.

Further, FIG. 3 is an exploded perspective view of the antenna module shown in FIG. 1.

Referring to FIGS. 1 through 3, an antenna module 100 according to an embodiment includes a wiring part 40 and a magnetic part 80.

The wiring part 40 has a form of a substrate. In more detail, the wiring part 40 includes an insulating substrate 41 and a communications wiring 45 formed on the insulating substrate 41.

The insulating substrate 41 refers to a substrate wherein a circuit wiring is formed on one surface or opposite surfaces thereof, and for example, an insulating film (e.g., a polyimide film) may be used. In this case, the wiring part 40 has a form of a flexible printed circuit board (PCB). However, the wiring part 40 is not limited thereto, and various kinds of substrates (e.g., a printed circuit board, a ceramic substrate, a glass substrate, an epoxy substrate, a flexible substrate, and the like) which are known in the art may be selectively used as long as the circuit wiring may be formed on the opposite surfaces thereof.

The communications wiring 45 may be formed on opposite surfaces of the insulating substrate 41 and have a form of the circuit wiring formed of a copper foil or the like.

The communications wiring 45 according to an embodiment may be manufactured by patterning double sided copper clad laminates (CCL). In addition, the communications wiring 45 may be formed on the opposite surfaces of a flexible insulating substrate such as a film by a photolithography method, and may be manufactured in the flexible PCB (FPCB) having a double sided structure, for example.

Accordingly, the wiring part 40 according to an embodiment has a thickness which is very thin. However, the wiring part 40 may be manufactured in a multilayer substrate, or may also be manufactured in a form of the printed circuit board (PCB) having rigidity, as needed.

The communications wiring 45 may be formed in a form in which the communications wiring 45 protrudes from the insulating substrate 41, not a form in which the communications wiring 45 is embedded in the insulating substrate 41. In this case, a distance at which the communications wiring 45 protrudes from the insulating substrate 41 is similar to or the same as a thickness of a magnetic part 80 to be describe below.

Further, the communications wiring 45 may be formed of a single wire coil, or may also be formed of a coil of a Litz wire form formed of several strands.

The communications wiring 45 according to an embodiment includes a first antenna wiring 42, a second antenna wiring 43, and a power receiving wiring 44. Each of the first antenna wiring 42, the second antenna wiring 43, and the power receiving wiring 44 are formed as a wiring having a spiral shape.

The first antenna wiring 42 may be classified as a first pattern 42*a* disposed on a first surface (a lower surface in FIG. 2) of the insulating substrate 41, facing a first magnetic part 80*a* to be described below, and disposed between the first magnetic part 80*a* and the insulating substrate 41, and a second pattern 42*b* exposed externally from the first magnetic part 80*a*.

Meanwhile, although an embodiment shows an example in which the first antenna wiring 42 is only disposed on a first surface of the insulating substrate 41, a configuration is not limited thereto and may be variously modified.

For example, the first antenna wiring 42 may be disposed on the second surface of the insulating substrate 41 or may also be disposed to be distributed on opposite surfaces thereof.

An overall contour of the first antenna wiring 42 may be an annular shape (or a ring shape). Therefore, the first antenna wiring 42 may have a region (hereinafter, referred to as an inner region) in which wiring is not formed at the center of the first antenna wiring 42.

The first antenna wiring 42 configured as described above may be used as a magnetic secure transmission (MST) antenna. However, the first antenna wiring 42 is not limited thereto.

The second antenna wiring 43 and the power receiving wiring 44 may be disposed to be spaced apart from the first antenna wiring 42. “Spaced apart” can generally mean that the spiral shapes of the power receiving wiring, the second antenna wiring, and the first antenna wiring are not in contact with each other.

The second antenna wiring 43 and the power receiving wiring 44 may be each disposed on opposite surfaces of the insulating substrate 41, and a portion disposed on the first surface of the insulating substrate 41 and a portion disposed on the second surface thereof may have the same shape as each other, such that both ends thereof are connected to each other. Therefore, the second antenna wiring 43 and the power receiving wiring 44 may each have a structure in which two spiral coil wirings are connected to each other in parallel.

However, a configuration is not limited thereto and may be variously modified. For example, the wiring may be formed only on any one surface of the opposite surfaces of the insulating substrate 41, or the wirings formed on the opposite surfaces thereof may be connected in series with each other.

An overall contour of the second antenna wiring 43 and the power receiving wiring 44 may also be an annular shape (or a ring shape). Therefore, the second antenna wiring 43 and the power receiving wiring 44 may have inner regions in which the wiring is not formed at the center of the second antenna wiring 43 and the power receiving wiring 44, and the power receiving wiring 44 may be disposed in the internal region of the second antenna wiring 43.

According to an embodiment, the second antenna wiring 43 is used as a near field communication (NFC) antenna, and the power receiving wiring 44 may be used as a wireless charging coil. However, the configuration of the present disclosure is not limited thereto.

A magnetic field formed by the second antenna wiring 43 and the power receiving wiring 44 may have a magnetic path formed along a first magnetic part 80*a* to be described below. Therefore, both the second antenna wiring 43 and the power receiving wiring 44 may be disposed in a position facing the first magnetic part 80*a*.

Meanwhile, in the description, the antenna wiring 45 and the magnetic part 80 being disposed to be opposite to each other or disposed to face each other means that they are disposed to overlap each other when the antenna wiring 45 is projected to the first magnetic part 80*a* or the second magnetic part 80*b* in a state in which the wiring part 40 and the magnetic part 80 are coupled to each other.

Therefore, the meaning that the antenna wiring 45 and the magnetic part 80 are disposed to be opposite to each other or disposed to face each other is not limited to a case in which the antenna wiring 45 and the magnetic part 80 are disposed to be in contact with each other when the wiring part 40 and the magnetic part 80 are coupled to each other, and may include a case in which the wiring part 45 and the magnetic part 80 are disposed in regions in which they face each other.

Even though the second antenna wiring 43 is only disposed on the second surface (an upper surface in FIG. 2) of the insulating substrate 41 and the first magnetic part 80*a* is disposed on the first surface (a lower surface in FIG. 2) of the insulating substrate 41, since the second antenna wiring 43 is disposed in a region facing the first magnetic part 80*a*, the second antenna wiring 43 and the first magnetic part 80*a* maybe disposed to be opposite to each other or disposed to face each other.

In addition, in portions in which the first antenna wiring 42, the second antenna wiring 43, and the power receiving wiring 44 intersect each other, respective wirings are disposed to be distributed on opposite surfaces of the insulating substrate 41. For example, when two wirings intersect on the first surface of the insulating substrate 41, one of the intersecting wirings may be disposed to pass through the insulating substrate 41 and to bypass the second surface of the insulating substrate 41. Thus, a plurality of wirings may be disposed so as not to overlap each other.

However, a configuration of the present disclosure is not limited thereto, and various modifications are possible. For example, the insulating substrate includes a multilayer substrate in which a plurality of wiring layers are stacked other than a double-sided substrate, the intersecting wirings are disposed in different wiring layers, and the like.

Meanwhile, in the drawing, the first antenna wiring 42, the second antenna wiring 43, and the power receiving wiring 44 are illustrated as having the same line width, which is for convenience of explanation, and a configuration of the present disclosure is not limited thereto.

For example, since the second antenna wiring 43 used as a near field communication (NFC) antenna has a frequency band higher than a frequency band of the first antenna wiring 42 used as a magnetic secure transmission (MST) antenna, the second antenna wiring may be formed to have a line width finer than a line width of the first antenna wiring 42. Moreover, since the power receiving wiring 44 uses a frequency band lower than a frequency band of the second antenna wiring 43, the power receiving wiring may be formed to have a line width wider than a line width of the second antenna wiring 43.

Moreover, the first antenna wiring 42 may be formed to have the same line width as a line width of the power receiving wiring 44, but is not limited thereto. Alternatively, the first antenna wiring may be formed to have a line width narrower or wider than a line width of the power receiving wiring 44.

The magnetic part 80 may be used as a magnetic path of a magnetic field generated by the communications wiring 45 of the wiring part 40 and may be provided to efficiently form the magnetic path of the magnetic field. To this end, the magnetic part 80 may be formed of a material capable of easily forming the magnetic path, and for example, a material having magnetic permeability such as a ferrite, a nanocrystal magnetic material, an amorphous magnetic material, a silicon steel plate, or the like may be used.

The magnetic part 80 may be formed in a flat shape like a sheet and may be each disposed on opposite surfaces of the wiring part 40.

In more detail, the magnetic part 80 includes a first magnetic part 80*a* disposed on one surface of the wiring part 40 (e.g., the first surface of the insulating substrate), and a second magnetic part 80*b* disposed on the other surface of the wiring part 40 (e.g., the second surface of the insulating substrate). Therefore, the wiring part 40 is disposed to be interposed between the first magnetic part 80*a* and the second magnetic part 80*b*.

In addition, the first magnetic part 80*a* and the second magnetic part 80*b* are disposed so as not to face each other. Here, the first magnetic part 80*a* and the second magnetic part 80*b* facing each other means that the first magnetic part 80*a* and the second magnetic part 80*b* face each other in a sandwich form while having the wiring part 40 interposed therebetween.

Therefore, the first magnetic part 80*a* and the second magnetic part 80*b* may be disposed so as not to overlap each other. Referring to FIG. 2, the second magnetic part 80*b* is not disposed over the first magnetic part 80*a*, and similarly, the first magnetic part 80*a* is not disposed below the second magnetic part 80*b*.

Meanwhile, a boundary at which the first magnetic part 80*a* and the second magnetic part 80*b* are in contact with each other is formed to cross a central region of the first antenna wiring 42. However, the first magnetic part 80*a* and the second magnetic part 80*b* may be disposed to be spaced apart from each other or disposed to partially overlap each other, as needed. Even in these cases, however, both the spaced portion and the overlapped portion may be disposed in the central region of the first antenna wiring 42.

The first magnetic part 80*a* may be coupled to the wiring part 40 so as to face the entirety of the second antenna wiring 43 and the power receiving wiring 44 which are formed on the first surface of the insulating substrate 41. Further, the first magnetic part 80*a* may be disposed to face a portion (e.g., a first pattern 42*a*) of the first antenna wiring 42. Here, the first antenna wiring 42 may be disposed so that about a half of the first antenna wiring 42 faces the first magnetic part 80*a*. However, the first antenna wiring 42 is not limited thereto.

The second magnetic part 80*b* may be coupled to the second surface of the insulating substrate 41 and may be disposed in a position corresponding to the first antenna wiring 42 exposed externally from the first magnetic part 80*a*.

Accordingly, the first pattern 42*a* of the first antenna wiring 42 maybe positioned to face the first magnetic part 80*a*, and the second pattern 42*b*, the remaining portion, may be positioned below the region in which the second magnetic part 80*b* is disposed.

Further, both a side surface of the first magnetic part 80*a* and a side surface of the second magnetic part 80*b* may be disposed at the central region of the first antenna wiring 42.

By the embodiment described above, the antenna module 100 according to an embodiment has the first magnetic part 80*a* and the second magnetic part 80*b* which have different sizes. In detail, the first magnetic part 80*a* has an area wider than that of the second magnetic part 80*b*.

Further, the magnetic part 80 according to an embodiment has the first magnetic part 80*a* having a thickness thicker than that of the second magnetic part 80*b*.

Figure 4:
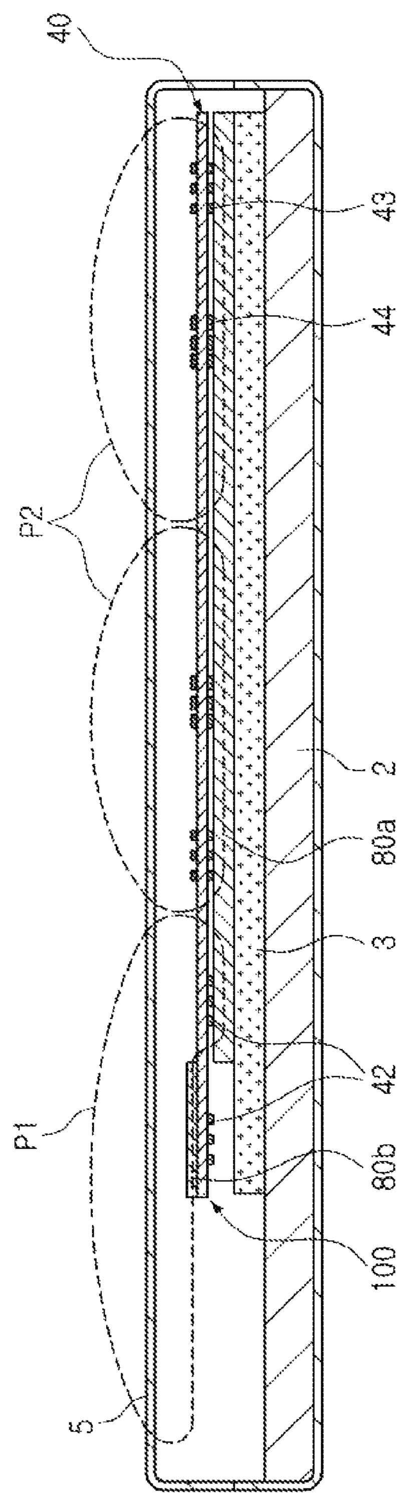
FIG. 4 is a cross-sectional view of an electronic device on which the antenna module shown in FIG. 2 is mounted.

Referring to FIG. 4, the first magnetic part 80*a* provides a magnetic path for the magnetic field generated by the power receiving wiring 44 and prevents leakage of the magnetic field toward a battery 3 or a terminal body 2 of the portable terminal. To this end, the first magnetic part 80*a* has a thickness capable of preventing leakage of the magnetic field. However, since the second magnetic part 80*b* is not disposed to be adjacent to the battery 3, the second magnetic part 80*b* may have a thickness thinner than that of the first magnetic part 80*a*.

Further, the magnetic part 80 according to an embodiment has the first magnetic part 80*a* and the second magnetic part 80*b* which have different magnetic permeability. For example, the second magnetic part 80*b* may be formed of a material having permeability higher than that of the first magnetic part 80*a*.

Since the second magnetic part 80*b* is intensively used for MST communications, it may be formed of a material (e.g., MnZn) having high permeability and high magnetic flux saturation density at a low frequency (e.g., 2 kHz). In more detail, a material having a magnetic flux saturation density of 0.5 T or more and the permeability of 700 or more may be used.

Further, since the first magnetic part 80*a* is mainly used for NFC communications or wireless charging, it may be formed of a material (e.g., NiZn) having high permeability, high magnetic flux saturation density, and a low loss rate at a relatively high frequency (e.g., 100 kHz, 13.56 MHz) as compared to the second magnetic part 80*b*. In more detail, a material having the magnetic flux saturation density of 0.35 T or more and magnetic permeability of 150 or more may be used.

Further, in a case in which the magnetic part is formed of nano crystal, the nano crystal may be prepared by crushing it into several fragments. In this example, the second magnetic part 80*b* may not be crushed or it may be minimally crushed to increase the permeability, and the first magnetic part 80*a* may be crushed more than the second magnetic part 80*b* to adjust the permeability and the loss rate.

Meanwhile, the antenna module 100 according to an embodiment may include an adhesive member (not shown) interposed between the wiring part 40 and the magnetic part 80 so that the wiring part 40 and the magnetic part 80 are firmly fixed and adhered to each other.

The adhesive member may be disposed between the wiring part 40 and the magnetic part 80 and bond the magnetic part 80 and the wiring part 40 to each other. Such an adhesive member may be formed by an adhesive sheet or an adhesive tape, and may also be formed by coating the surface of the wiring part 40 or the magnetic part 80 with an adhesive or a resin having adhesive property.

Further, the adhesive member may also have magnetic property by configuring the adhesive member to contain magnetic powders.

Since the antenna module 100 according to an embodiment configured as described above is manufactured in a form of a flat substrate by attaching the magnetic part 80 of the sheet form onto the opposite surfaces of the wiring part 40, but a direction P1 (FIG. 4) of the magnetic field generated by the first antenna wiring 42 is formed in a plane direction of the antenna module 100 along the first and second magnetic parts 80*a* and 80*b*, the antenna module 100 may operate in the same fashion as a solenoid antenna. Therefore, a shape or a direction of the magnetic field generated by the first antenna wiring 42 of the antenna module 100 may be adjusted to a specific direction.

Further, since intensity of the magnetic field generated by the first antenna wiring 42 may extend due to the solenoid structure describe above, the same communications efficiency as the related art is maintained even though the size of the antenna module 100 is reduced.

Further, since the second antenna wiring 43 and the power receiving wiring 44 which are formed on the wiring part 40 form the magnetic fields in paths different from the first antenna wiring 42, interference between the antenna wirings may be significantly reduced, thereby increasing transmission efficiency of each of the antenna wirings.

In addition, since the antenna module 100 may be manufactured only by an operation of stacking the magnetic part 80 on the opposite surfaces of the wiring part 40, the antenna module 100 is very easily manufactured.

FIG. 4 is a cross-sectional view of an electronic device on which the antenna module illustrated in FIG. 2 is mounted.

Referring to FIG. 4, an electronic device 1 according to an embodiment, a portable terminal including an antenna module 100 (FIG. 1) described above, may perform various wireless communications through the antenna module 100.

The electronic device 1 may include a terminal body 2, a case 5, a battery 3, and the antenna module 100.

The antenna module 100 and the battery 3 may be accommodated in an inner space formed by the terminal body 2 and the case 5.

The terminal body 2 may include various elements for driving the electronic device, such as a circuit board or a display.

The battery 3 may be disposed in an inner space formed by the case 5 and the terminal body 2, and store power received through the power receiving wiring 44 of the antenna module 100 and then supply the power to the terminal body 2.

The antenna module 100 may be disposed between the case 5 and the battery 3. In this case, the first magnetic part 80*a* of the antenna module 100 may be disposed to be adjacent to the battery 3 and the second magnetic part 80*b* thereof may be disposed between the wiring part 40 and the case 5.

Therefore, the magnetic field formed by the first antenna wiring 42 maybe formed as denoted by P1 and the magnetic field formed by the second antenna wiring 43 or the power receiving wiring 44 may be formed as denoted by P2.

Meanwhile, the electronic device 1 described in an embodiment may include a cellular phone (or a smartphone). However, the electronic device is not limited thereto, and may include any electronic device which may be carried and which may perform wireless communications such as a notebook, a tablet PC, a wearable device, or the like.

The antenna module is not limited to the above-mentioned embodiments, but may be variously modified.

In descriptions of other embodiments, a detailed description of the same component as described above will be omitted.

Figure 5:
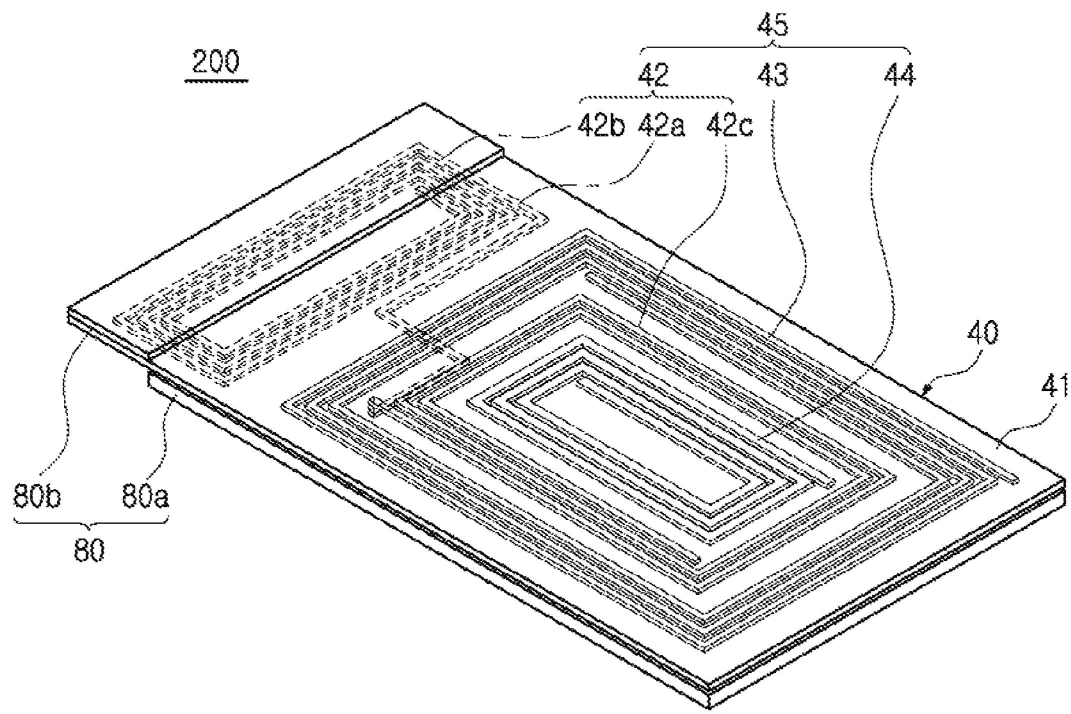
FIGS. 5 through 11 are perspective views each showing an antenna module according to embodiments.

FIG. 5 is a perspective view of an antenna module according to an embodiment.

Referring to FIG. 5, an antenna module 200 according to an embodiment has an extended wiring 42*c* of the first antenna wiring 42 disposed between the second antenna wiring 43 and the power receiving wiring 44. The extended wiring 42*c* is disposed within the second antenna wiring 43 and is connected to the first antenna wiring 42 disposed outside the second antenna wiring 43.

In an example in which the antenna module 200 is configured as described above, a magnetic field formed by the extended wiring 42*c* of the first antenna wiring 42 may be formed as denoted by P2 in FIG. 4.

Therefore, since the magnetic field formed by the first antenna wiring 42 includes both the forms of P1 and P2, the magnetic field is formed in a very wide range to increase communications reliability and a recognition rate.

Further, the extended wiring 42*c* illustrated in FIG. 5 may have a spiral direction, formed in a direction opposite to the first antenna wiring 42. Thereby, a current may flow in a clockwise direction in the first antenna wiring 42, and may flow in a counterclockwise direction in the extended wiring 42*c*.

As such, in a case in which the spiral directions of the first antenna wiring 42 and the extended wiring 42*c* are disposed to be opposite to each other, a portion of the magnetic field forms a closed loop passing through the center of the first antenna wiring 42 in a first direction (a bottom to top direction) and passing through the center of the extended wiring 42*c* in a second direction (a top to bottom direction) opposite to the first direction.

Therefore, the magnetic field formed by the first antenna wiring 42 and the magnetic field formed by the extended wiring 42*c* has an extended range by the extended magnetic fields passing through both of the two wirings, thereby extending a range of short-range communications.

Meanwhile, although an embodiment illustrates an example in which the first antenna wiring 42 is disposed in the region between the second antenna wiring 43 and the power receiving wiring 44, the embodiment is not limited thereto and may be variously modified. For example, the first antenna wiring 42 may be disposed in a region outside the second antenna wiring 43 so as to surround the second antenna wiring 43, or be disposed within the power receiving wiring 44. Further, only a portion of the extended wiring 42*c* may be disposed outside the second antenna wiring 43 or be disposed within the power receiving wiring 44.

Figure 6:
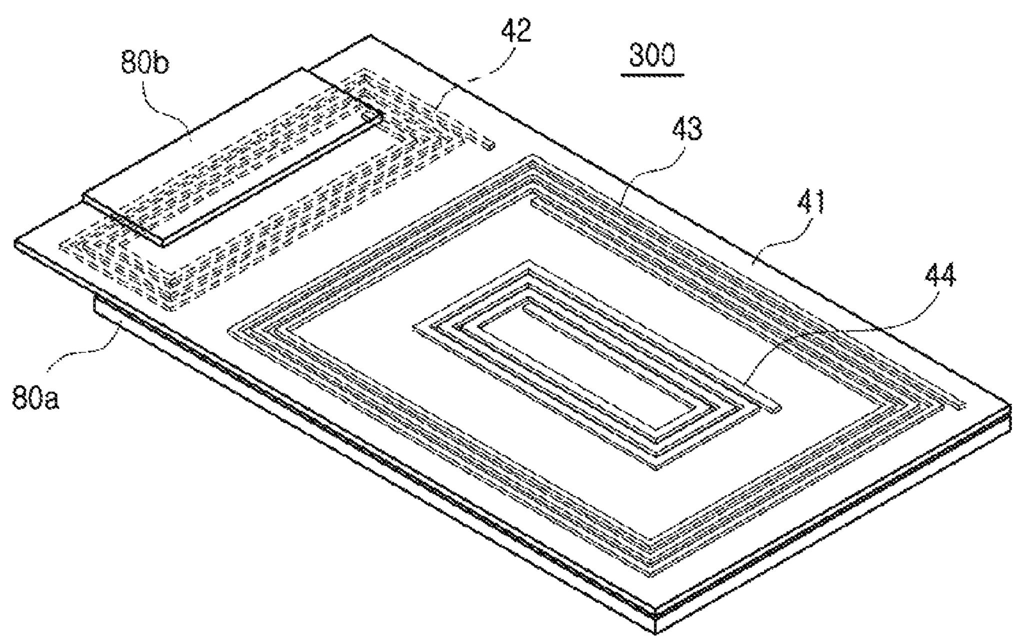

FIG. 6 is a perspective view of an antenna module according to an embodiment.

Referring to FIG. 6, an antenna module 300 according to an embodiment may have the second magnetic part 80*b* which is not formed to have the same size as a width of the insulating substrate 41 and is formed to be smaller than the width of the insulating substrate 41.

Accordingly, the second magnetic part 80*b* is disposed to face a region smaller than a half of the first antenna wiring 42, but not the half of the first antenna wiring 42.

As such, as long as a side of the first magnetic body and a side of the second magnetic body are disposed at the central region of the first antenna wiring, the antenna module according to embodiments may form the first magnetic body and the second magnetic body in various forms and sizes.

Figure 7:
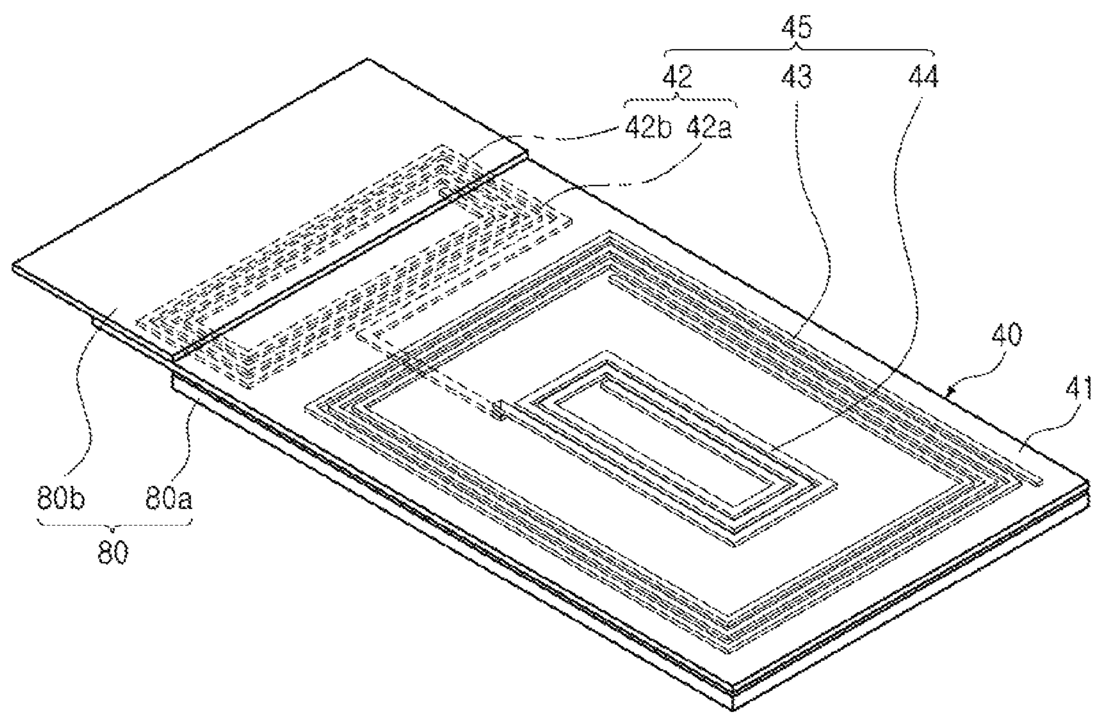

FIG. 7 is a perspective view of an antenna module according to an embodiment.

Referring to FIG. 7, an antenna module according to an embodiment has the second magnetic part 80*b* coupled to the wiring part 40 so as to protrude externally from the wiring part 40 by a certain distance. Accordingly, a range of a magnetic field generated by the first antenna wiring 42 is maximally extended.

Meanwhile, the magnetic secure transmission (MST) and the wireless charging may not be simultaneously performed in the electronic device such as the portable terminal and any one function may be selectively performed.

Accordingly, the antenna module according to an embodiment connects the first antenna wiring 42 and the power receiving wiring 44 with each other and uses the power receiving wiring 44 as a magnetic secure transmission (MST) antenna together with the first antenna wiring 42.

In this embodiment, when the magnetic secure transmission (MST) is performed in the electronic device, the power receiving wiring 44 operates as the magnetic secure transmission (MST) antenna together with the first antenna wiring 42. In addition, when the wireless charging is performed in the electronic device, the power receiving wiring 44 may independently operate as a wireless charging coil.

To this end, a switching circuit (not shown) may be added to a portion at which the first antenna wiring 42 and the power receiving wiring 44 are connected with each other.

Figure 8:
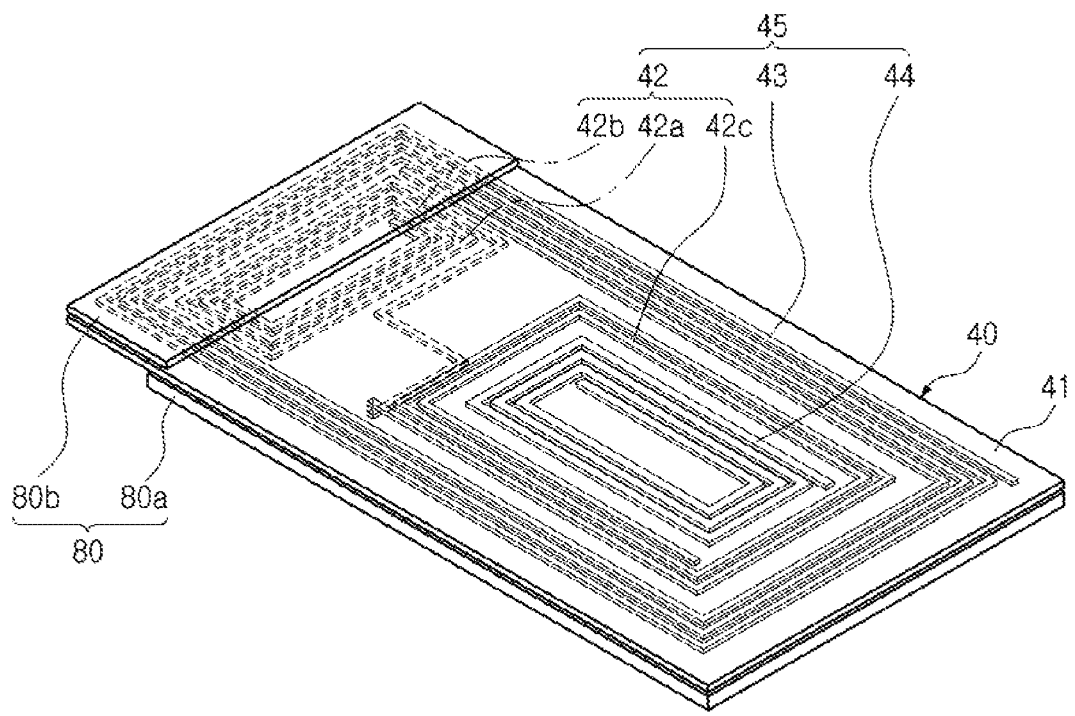

FIG. 8 is a perspective view of an antenna module according to an embodiment.

Referring to FIG. 8, an antenna module according to an embodiment has the second antenna wiring 43, disposed along an outer portion of the insulating substrate 41, and a portion of the second antenna wiring 43 is disposed to overlap the second magnetic part 80*b,* accordingly. In addition, both the first antenna wiring 42 and the power receiving wiring 44 are disposed within the second antenna wiring 43.

In the embodiment in which the antenna module is configured as described above, since the magnetic field generated by the second antenna wiring 43 disposed to face the second magnetic part 80*b* is formed in the plane direction of the antenna module along the first and second magnetic parts 80*a* and 80*b* similarly to the magnetic field generated by the first antenna wiring 42, the antenna module operates in the same fashion as a solenoid antenna.

Therefore, a range of the magnetic field generated by the second antenna wiring 43 is extended.

Figure 9:
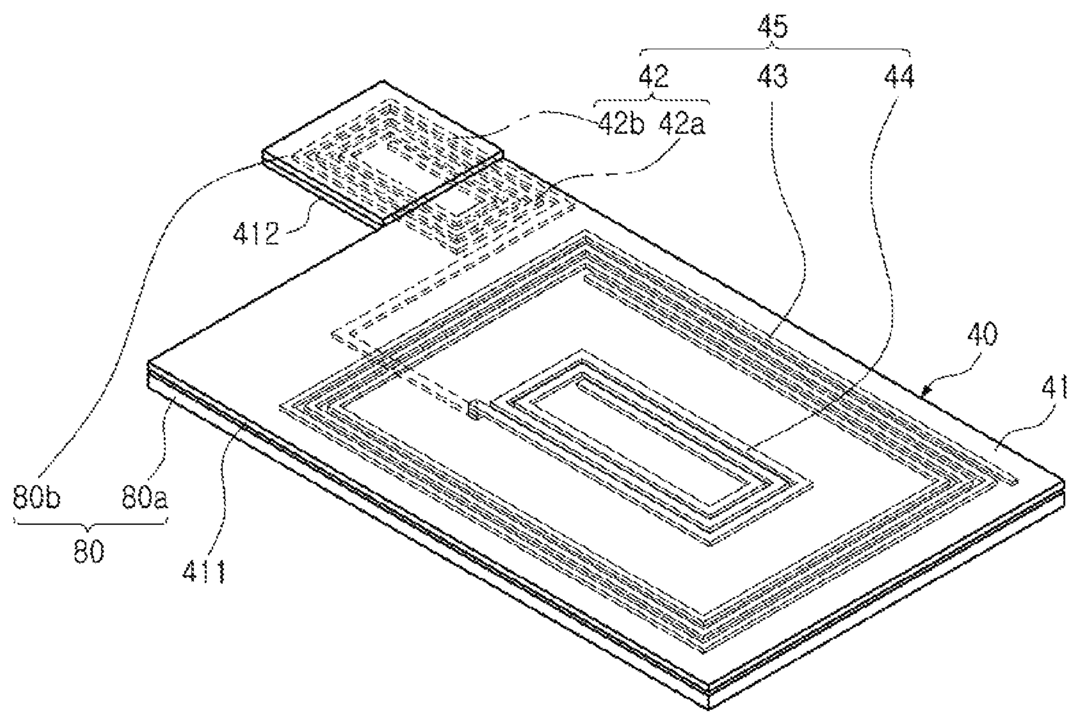

FIG. 9 is a perspective view of an antenna module according to an embodiment.

Referring to FIG. 9, an antenna module according to an embodiment has the first antenna wiring 42 formed to have a size smaller than the second antenna wiring 43. In more detail, the first antenna wiring 42 is disposed in a position which tends to one side as compared to embodiments described above and may be disposed with a narrow width as compared to embodiments described above.

In more detail, the insulating substrate 41 according to an embodiment may be classified as a body part 411 having the second antenna wiring 43 disposed thereon and facing the first magnetic part 80*a,* and an extended portion 412 partially protruding from the body part 411.

The extended portion 412 may have a width smaller than that of the body part 411 and may be partially extended from any one of sides of the body part 411.

A portion of the first antenna wiring 42 is disposed on the extended portion 412 and the other portion thereof is disposed on the body part 411.

The second magnetic part 80*b* may be disposed to face the extended portion 412. Accordingly, the second magnetic part 80*b* may have the same area as the extended portion 412 and may be disposed together with the first antenna wiring 42 at a position that tends to one side of the body part 411.

Such a configuration prevents a camera and the antenna module from overlapping each other, when the camera and the like are disposed in the electronic device. Therefore, the positions of the first antenna wiring 42 and the second magnetic part 80*b* are not limited to the positions illustrated in FIG. 9, and the first antenna wiring 42 and the second magnetic part 80*b* may be formed in various forms and various sizes in a range that does not overlap the camera.

Figure 10:
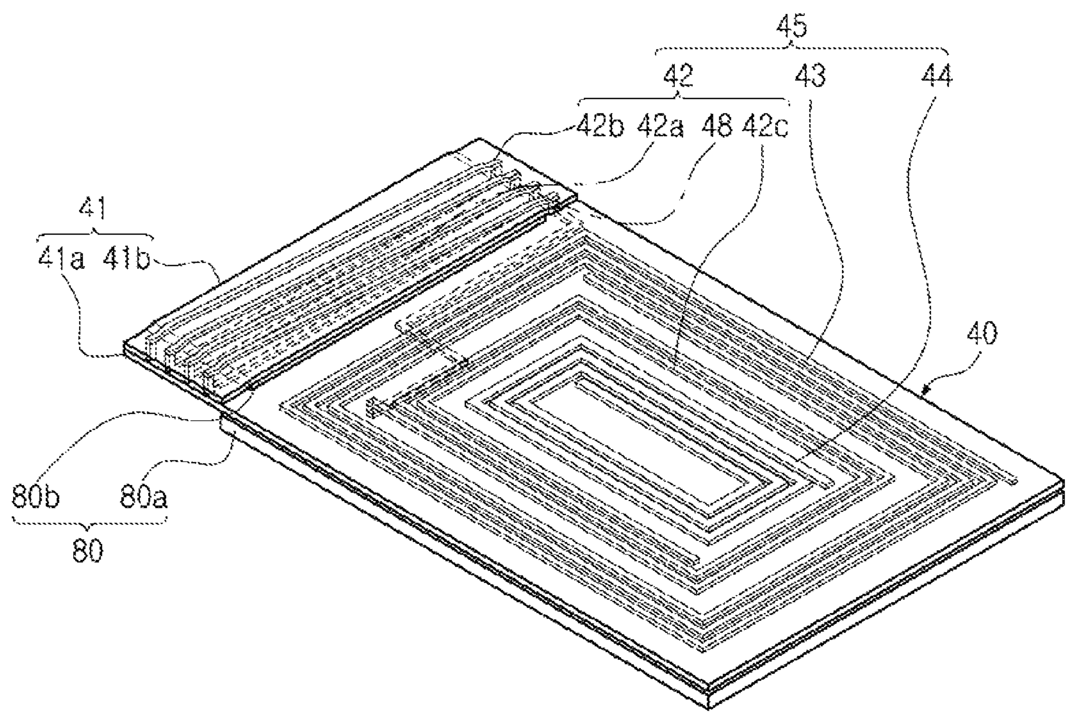

FIG. 10 is a perspective view of an antenna module according to an embodiment.

Referring to FIG. 10, an antenna module according to an embodiment includes a first substrate 41*a* that the insulating substrate 41 is disposed on one surface (e.g., the first surface) of the opposite surfaces of the second magnetic part 80*b,* and a second substrate 41*b* that the insulating substrate 41 is disposed on the other surface (e.g., the second surface) of the second magnetic part 80*b*. Therefore, the second magnetic part 80*b* is interposed between the first substrate 41*a* and the second substrate 41*b* and stacked in a sandwich form.

Both the first substrate 41*a* and the second substrate 41*b* have an area wider than the second magnetic part 80*b,* and portions extended outside the second magnetic part 80*b* are bonded and connected to each other. Interlayer connection conductors 48 may be disposed on the portion at which the first substrate 41*a* and the second substrate 41*b* are bonded to each other.

Further, the first antenna wiring 42 includes a first pattern 42*a* disposed on the first substrate 41*a,* a second pattern 42*b* disposed on a second substrate 41*b,* and interlayer connection conductors 48 that connect the first pattern 42*a* and the second pattern 42*b* with each other. The interlayer connection conductors 48 penetrate through the first substrate 41*a* and the second substrate 41*b* and electrically connect the first pattern 42*a* and the second pattern 42*b* with each other.

Since the interlayer connection conductors 48 are disposed on the portion at which the first substrate 41*a* and the second substrate 41*b* are bonded to each other, the interlayer connection conductors 48 may not be in contact with the second magnetic part 80*b* and be disposed to be spaced apart from the second magnetic part 80*b*.

The first pattern 42*a* and the second pattern 42*b* include linear patterns, and opposite ends of each of the linear patterns are connected to the interlayer connection conductor 48. Therefore, the first antenna wiring 42 completes one turn by continuously connecting the first pattern 42*a*, the interlayer connection conductor 48, the second pattern 42*b,* and the interlayer connection conductor 48, and these turns may be repeatedly disposed to complete the wiring having a solenoid structure wound around the second magnetic part 80*b*.

The antenna module according to an embodiment as described above may have the first antenna wiring 42 disposed in a solenoid structure. Therefore, an area occupied by the first antenna wiring 42 is significantly reduced and intensity of the magnetic field generated by the first antenna wiring 42 is significantly increased.

Meanwhile, the second antenna wiring 43, the power receiving wiring 44, and the extended wiring 42*c* may be disposed on the first substrate 41*a*.

Figure 11:
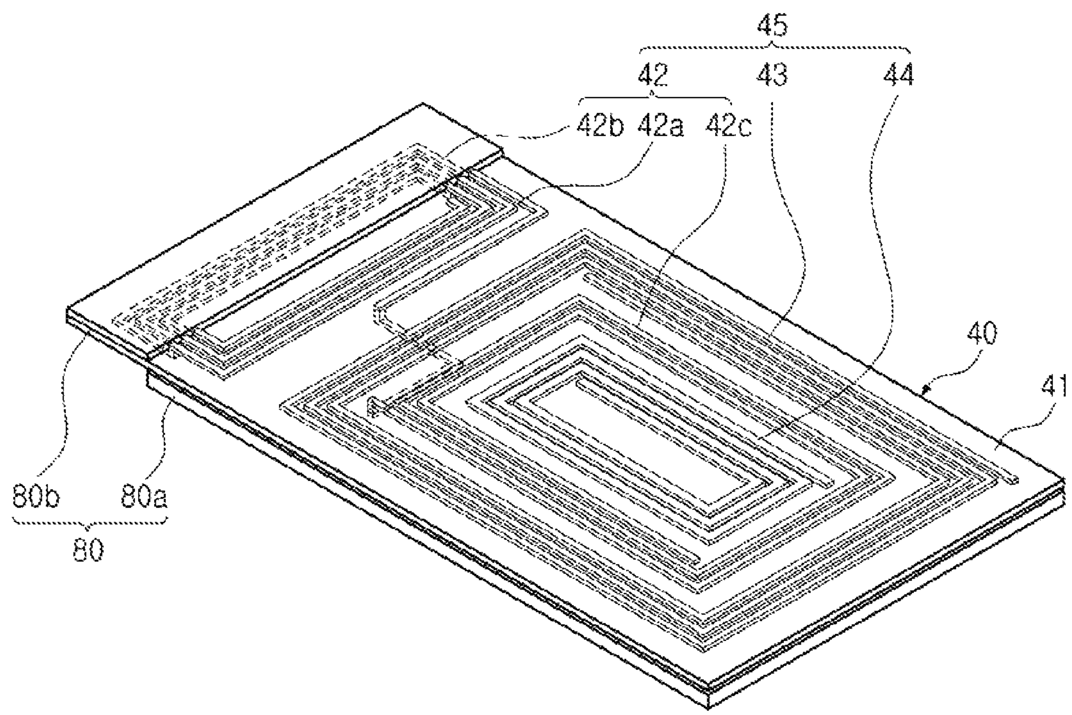

FIG. 11 is a perspective view of an antenna module according to an embodiment.

Referring to FIG. 11, an antenna module according to an embodiment has the first antenna wiring 42 formed on the opposite surfaces of the insulating substrate 41. In more detail, the first pattern 42*a* is disposed on the second surface of the insulating substrate 41 and the second pattern 42*b* is disposed on the first surface of the insulating substrate 41 to externally expose the entirety or most of the first antenna wiring 42 from the magnetic part 80.

In this embodiment, the interlayer connection conductors connecting the first pattern 42*a* and the second pattern 42*b* may be disposed in the insulating substrate 41.

As such, in an embodiment in which the first pattern 42*a* and the second pattern 42*b* are disposed to be distributed on opposite surfaces of the insulating substrate 41, the first magnetic part 80*a* and the second magnetic part 80*b* are disposed in a region in which the first antenna wiring 42 is not formed, and the entirety of the second magnetic part 80*b* is in surface contact with the insulating substrate 41 and coupled to the wiring part 40, accordingly. Therefore, an overall thickness of the antenna module is significantly reduced.

Figure 12:
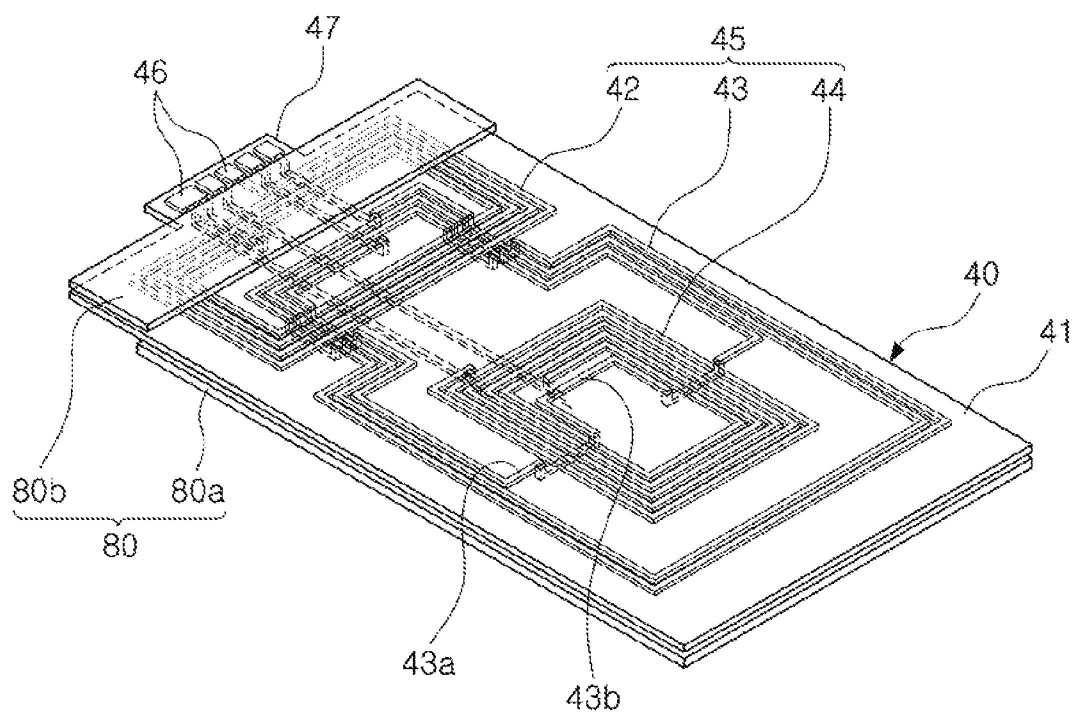
FIG. 12 is a perspective view of an antenna module according to another embodiment.
Figure 13:
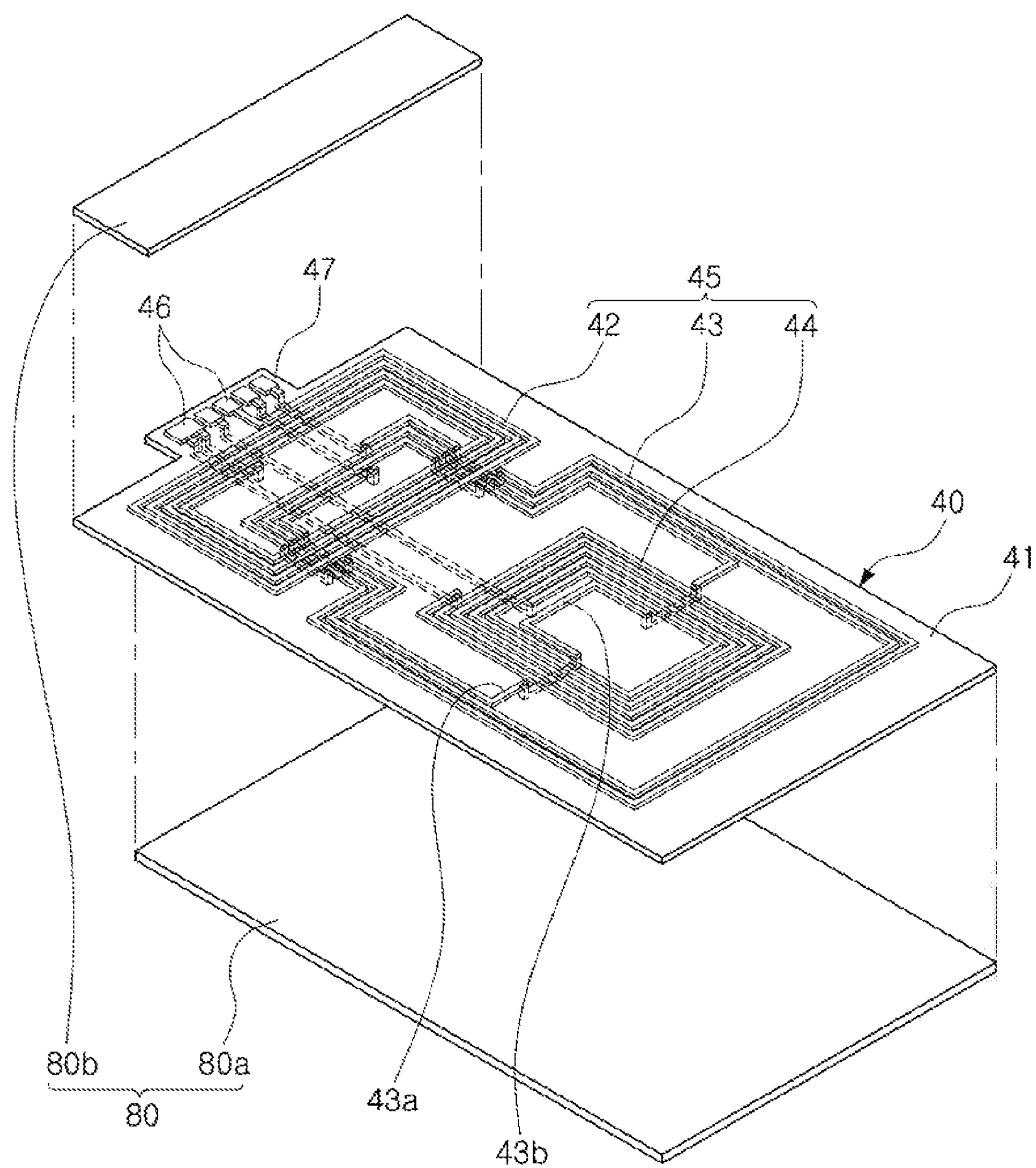
FIG. 13 is an exploded perspective view of the antenna module shown in FIG. 12.

FIG. 12 is a perspective view of an antenna module according to another embodiment and FIG. 13 is an exploded perspective view of the antenna module shown in FIG. 12.

Referring to FIGS. 12 and 13, the antenna module according to an embodiment may connect one end of the first antenna wiring 42 and one end of the power receiving wiring 44 with each other and use the power receiving wiring 44 as a magnetic secure transmission (MST) antenna together with the first antenna wiring 42, similarly to the antenna module shown in FIG. 7.

Therefore, when the magnetic secure transmission (MST) is performed in the electronic device, the power receiving wiring 44 may operate as the magnetic secure transmission (MST) antenna, together with the first antenna wiring 42. In addition, when the wireless charging is performed in the electronic device, the power receiving wiring 44 may operate independently as a wireless charging coil.

Further, the antenna module according to an embodiment is disposed so that a portion 43*a* (hereinafter, referred to as a divided wiring) of the second antenna wiring 43 used as a near field communication (NFC) antenna crosses an inner region of the second antenna wiring 43. In detail, the divided wiring 43*a* is disposed within the second antenna wiring 43 in a form in which it approximately bisects the inner region of the second antenna wiring 43.

Since the power receiving wiring 44 is disposed in the internal space of the second antenna wiring 43, the divided wiring 43*a* is also disposed to cross the power receiving wiring 44.

Such a divided wiring 43*a* is provided to prevent a tag recognition rate from being reduced within the second antenna wiring 43. That is, as the divided wiring 43*a* is disposed to cross the inner region of the second antenna wiring 43, the tag recognition rate within the second antenna wiring 43 may be increased by a magnetic field formed through the divided wiring 43*a*.

Further, the divided wiring 43*a* includes a modified pattern 43*b* formed in a central portion thereof.

When the central portion of the divided wiring 43*a* is configured in a spiral shape, the intensity of the magnetic field may be increased within the second antenna wiring 43, but magnetic flux of the magnetic filed is offset due to interference with a magnetic field generated from the second antenna wiring 43 disposed outwardly of the power receiving wiring 44, thereby resulting in degradation in the recognition rate.

Therefore, the modified pattern 43*b* according to an embodiment is formed in a shape protruding from the central portion of the divided wiring 43*a* to one side thereof, not the spiral shape. In more detail, the modified pattern 43*b* approaches the second antenna wiring 43 disposed outwardly of the power receiving wiring 44 toward the center of the second antenna wiring 43. According to an embodiment, since the modified pattern 43*b* is disposed within the power receiving wiring 44, a shape of the modified pattern 43*b* is similar to a shape of the wiring disposed in the innermost portion of the power receiving wiring 44. For example, according to an embodiment, the modified pattern 43*b* is formed to have a '⊏' shape, according to a shape of the inner region of the power receiving wiring 44. The configuration of the present disclosure is not limited thereto, however, and may be variously modified as needed. For example, the modified pattern 43*b* is formed in a half circular shape or a trapezoidal shape.

Further, the modified pattern 43*b* according to an embodiment is disposed to approach the second antenna wiring 43 disposed to be adjacent to the first antenna wiring 42 toward the center of the modified pattern 43*b*.

Such a configuration is derived to significantly reduce a mutual offset of a magnetic flux of the second antenna wiring 43 and a magnetic flux of the divided wiring 43*a* which are disposed at opposite sides due to interference.

Therefore, the modified pattern 43*b* is disposed to be spaced apart from a wiring of the second antenna wiring 43 with which the magnetic flux is offset.

Further, the antenna module according to an embodiment includes a portion of the second antenna wiring 43 which is disposed within the first antenna wiring 42. Such a configuration is derived to dispose the second antenna wiring 43 to be maximally spaced apart from the power receiving wiring 44.

According to most of the embodiments described above, the second antenna wiring 43 is disposed to surround the power receiving wiring 44. In this example, a partial section of the second antenna wiring 43 needs to be disposed between the first antenna wiring 42 and the power receiving wiring 44.

Therefore, when a size of the insulating substrate 41 is small, the section of the second antenna wiring 43 is closely disposed to be close proximity to the first antenna wiring 42 and the power receiving wiring 44.

As described above, however, the antenna module according to an embodiment includes the power receiving wiring 44 that operates as the magnetic secure transmission (MST) antenna, together with the first antenna wiring 42, and to this end, the power receiving wiring 44 and the first antenna wiring 42 are electrically connected to each other.

Therefore, as in the embodiment shown in FIG. 7, when the second antenna wiring 43 disposed between the first antenna wiring 42 and the power receiving wiring 44 is disposed, interference may occur in the corresponding section by the first antenna wiring 42 and the power receiving wiring 44, resulting in degradation of the recognition rate.

According to an embodiment, a partial section of the second antenna wiring 43 disposed between the first antenna wiring 42 and the power receiving wiring 44 in the embodiment shown in FIG. 7 is disposed within the first antenna wiring 42.

The above-mentioned section is disposed in the central portion of the inner region of the first antenna wiring 42 so as to be maximally spaced apart from the first antenna wiring 42 within the first antenna wiring 42. Further, at least a portion of the section is disposed to be parallel to the first antenna wiring 42.

In an example in which the antenna module is configured as described above, it is confirmed that the recognition rate of the second antenna wiring 43 used as a near field communication (NFC) antenna is improved.

In addition, according an embodiment, the first magnetic part 80*a* faces the second antenna wiring 43 and the power receiving wiring 44. Therefore, a boundary at which the first magnetic part 80*a* and the second magnetic part 80*b* are in contact with each other is formed to bisect a central region of the first antenna wiring 42 as a whole, and is formed along an outer edge of the second antenna wiring in a portion in which the second antenna wiring 43 is disposed.

In addition, according to an embodiment, the first magnetic part 80*a* and the second magnetic part 80*b* are disposed so that at least portions thereof overlap each other. In more detail, the first magnetic part 80*a* and the second magnetic part 80*b* overlap each other at a boundary portion.

Meanwhile, the wiring part 40 according to an embodiment includes a terminal part 47 for electrical connection with the outside. In addition, the terminal part 47 extends to protrude from one side of the wiring part 40 and is exposed to the outside of the magnetic part 80.

In addition, a plurality of connection terminals 46 are disposed on the terminal part 47, and each of the connection terminals 46 is connected to an end portion of each of the communications wirings 45.

The antenna module according to an embodiment includes the first antenna wiring 42, the second antenna wiring 43, and the power receiving wiring 44. Therefore, six connection terminals 46 are basically required. However, as described above, since one end of the power receiving wiring 44 and one end of the first antenna wiring 42 are connected to each other, one end of the power receiving wiring 44 and one end of the first antenna wiring 42 include one connection terminal 46. Therefore, the terminal part 47 according to an embodiment may include only five connection terminals 46. However, a configuration is not limited thereto, and the number of the connection terminals 46 may be changed as needed.

As set forth above, according to embodiments, since the antenna module is manufactured by stacking the first magnetic part and the second magnetic part on the opposite surfaces of the wiring part, the antenna module is easily manufactured.

Further, since the first antenna wiring has a solenoid structure, the intensity of the magnetic field generated from the first antenna wiring is extended, whereby the same communications efficiency as the related art is maintained even though the size of the antenna module is reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna module comprising:

a wiring part comprising a first antenna wiring and a second antenna wiring each disposed on a substrate; and a magnetic part comprising a first magnetic part disposed on one surface of the wiring part and a second magnetic part disposed on another surface of the wiring part, wherein the first magnetic part is disposed on one surface of the wiring part to face a portion of the first antenna wiring, and a portion or the entirety, of the second antenna wiring, and wherein the second magnetic part is disposed on the another surface of the wiring part to face the other portion of the first antenna wiring.

2. The antenna module of claim 1, wherein the second magnetic part is disposed not to overlap with the first magnetic part.

3. The antenna module of claim 1, wherein the first magnetic part and the second magnetic part comprise different materials or have different thicknesses.

4. The antenna module of claim 1, wherein the wiring part further comprises an extended wiring, disposed to face the first magnetic part and connected to the first antenna wiring.

5. The antenna module of claim 4, wherein the first antenna wiring and the extended wiring are disposed in spiral directions, and the spiral direction of the extended wiring is opposite to the spiral direction of the first antenna wiring.

6. The antenna module of claim 1, wherein the wiring part further comprises a power receiving wiring disposed to face the first magnetic part.

7. The antenna module of claim 6, wherein the first antenna wiring is connected to the power receiving wiring, and the first antenna wiring and the power receiving wiring are disposed in spiral directions, and the spiral direction of the power receiving wiring is opposite to the spiral direction of the first antenna wiring.

8. The antenna module of claim 1, wherein at least a portion of the second antenna wiring is disposed within the first antenna wiring.

9. The antenna module of claim 8, wherein at least a portion of the second antenna wiring disposed within the first antenna wiring is disposed to be parallel to the first antenna wiring.

10. The antenna module of claim 8, wherein the first magnetic part and the second magnetic part at least partially overlap with each other at a boundary at which the first magnetic part and the second magnetic part are in contact with each other.

11. The antenna module of claim 8, wherein the wiring part further comprises a power receiving wiring disposed within the second antenna wiring and having one end connected to one end of the first antenna wiring.

12. The antenna module of claim 8, wherein the second antenna wiring comprises a divided wiring disposed at the innermost portion of the second antenna wiring and disposed to cross the central region of the second antennal wiring.

13. The antenna module of claim 12, wherein the divided wiring comprises a modified pattern disposed to protrude to one side toward the center of the divided wiring.

14. The antenna module of claim 12, further comprising a power receiving wiring disposed within the second antenna wiring, wherein the divided wiring is disposed to cross the power receiving wiring.

15. The antenna module of claim 1, wherein the first antenna wiring is disposed within the second antenna wiring.

16. The antenna module of claim 1, wherein the wiring part comprises:

a body part, wherein the second antenna wiring is disposed on the body part; and an extended portion protruding from the body part, wherein a portion of the first antenna wiring is disposed on the extended portion, and wherein the extended portion has a width narrower than that of the body part.

17. The antenna module of claim 1, wherein the second magnetic part is coupled to the wiring part, wherein a portion of the second magnetic part protrudes externally from the wiring part.

18. The antenna module of claim 1, wherein the first antenna wiring comprises a solenoid structure wound around the second magnetic part.

19. The antenna module of claim 18, wherein the substrate comprises a first substrate and a second substrate, and the first antenna wiring comprises a first pattern disposed on the first substrate, a second pattern disposed on the second substrate, and interlayer connection conductors disposed to penetrate through the first substrate and the second substrate and connecting the first pattern and the second pattern with each other.

20. The antenna module of claim 1, wherein a boundary at which the first magnetic part and the second magnetic part are in contact with each other is disposed to cross a central region of the first antenna wiring.

21. The antenna module of claim 1, wherein the first antenna wiring comprises a first pattern disposed on a first surface of the substrate and a second pattern disposed on a second surface of the substrate, wherein the first magnetic part is disposed on the second surface of the substrate to face the first pattern, and wherein the second magnetic part is disposed on the first surface of the substrate to face the second pattern.

22. The antenna module of claim 21, wherein the second magnetic part is in surface contact with the substrate and is coupled to the wiring part.

23. An electronic device, comprising:

an antenna module comprising a wiring part comprising a first antenna wiring and a second antenna wiring disposed on a substrate, and a magnetic part comprising a first magnetic part disposed on one surface of the wiring part and a second magnetic part disposed on another surface of the wiring part; and a case comprising the antenna module, wherein the first magnetic part is coupled to one surface of the wiring part to face a portion of the first antenna wiring and the second magnetic part is coupled to the wiring part to face the other portion of the first antenna wiring, and wherein the second magnetic part is disposed between the wiring part and the case.

* * * * *